US006850287B1

(12) United States Patent
Sugiura et al.

(10) Patent No.: US 6,850,287 B1
(45) Date of Patent: Feb. 1, 2005

(54) SYSTEM FOR DISSIPATING ELECTRICAL CHARGE FROM A CABINET OF AN ELECTRONIC APPARATUS

(75) Inventors: Yutaka Sugiura, Kanagawa (JP); Tadashi Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 09/722,164

(22) Filed: Nov. 24, 2000

(30) Foreign Application Priority Data

Nov. 26, 1999 (JP) .......................................... 11-336331

(51) Int. Cl.[7] .............................. H04N 5/65; H02H 3/14

(52) U.S. Cl. ....................... 348/818; 348/820; 361/120; 361/212; 361/724

(58) Field of Search ................................ 348/818, 820, 348/836; 361/117, 120, 212, 220, 600, 679, 682, 724

(56) References Cited

U.S. PATENT DOCUMENTS 4,375,661 A * 3/1983 Savic .......................... 361/91
4,654,746 A 3/1987 Lewis, Jr. et al.
4,970,625 A * 11/1990 Belanger et al. ............ 361/424
5,122,921 A * 6/1992 Koss .......................... 361/111
5,311,393 A * 5/1994 Bird ........................... 361/104
5,726,603 A * 3/1998 Chawla et al. .............. 330/269
5,761,022 A * 6/1998 Rankilor ...................... 361/214
5,768,086 A 6/1998 Abe
5,898,560 A 4/1999 Flaynik, Jr. et al.
6,028,761 A * 2/2000 Cooter ....................... 361/212

FOREIGN PATENT DOCUMENTS

FR 2 696 349 4/1994
JP 10271414 A * 10/1998 ............ H04N/5/64

* cited by examiner

*Primary Examiner*—Victor R. Kostak
(74) *Attorney, Agent, or Firm*—Frommer Lawrence & Haug LLP; William S. Frommer; Bruno Polito

(57) ABSTRACT

A TV receiver having a metal front cabinet is provided with a discharge path between the front cabinet and a ground portion of the TV receiver. The discharge path includes a series circuit in which a discharge tube is connected in series to a parallel circuit of a first resistor and a high-voltage capacitor and a second resistor that is connected in parallel to the series circuit. The discharge path effectively discharges a voltage occurring at the front cabinet via the second resistor while preventing a sudden flow of current and reducing the influence of static electricity. The series circuit in which the discharge tube is connected in series to the parallel circuit of the first resistor and the high-voltage capacitor has a function of causing high-voltage pulses occurring at the ground portion GND to escape to the front cabinet while converting those into pulses having a low voltage level.

10 Claims, 2 Drawing Sheets

SYSTEM FOR DISSIPATING ELECTRICAL CHARGE FROM A CABINET OF AN ELECTRONIC APPARATUS

BACKGROUND OF THE INVENTION

1. Field of the Invention

The present invention relates to an electronic apparatus having a cabinet that includes a metal portion.

2. Description of the Related Art

Conventionally, for example, in many of TV receivers using a CRT, a cabinet that surrounds the outer circumferential portion of the face panel of the CRT is made of a synthetic resin.

However, there occurs a case that to provide a product with a high-grade image or improve design performance it is desired to use a metal cabinet. In this case, it is necessary to ground the metal cabinet.

To this end, methods are employed in which a metal member such as a cabinet as mentioned above and a ground portion that is provided on a chassis board of an electronic apparatus are directly connected to each other or connected to each other via a resistor.

However, where the metal member and the ground portion are directly connected to each other as mentioned above, static electricity causes a sudden flow of current when a user touches the electronic apparatus. This causes a problem that the user feels unpleasant.

Where the metal member and the ground portion are connected to each other via a resistor, when, for example, a high voltage occurs at the face panel portion of the CRT the high voltage cannot be absorbed only by the resistor. This also results in a problem that discharge or the like causes a user to feel unpleasant.

SUMMARY OF THE INVENTION

An object of the present invention is therefore to provide an electronic apparatus having a cabinet that is made of metal partially or entirely which can effectively ground the metal portion of the cabinet and cope with an indirect lightning stroke or the like while reducing impact of static electricity and preventing generation of a high voltage.

To attain the above object, the invention provides a first electronic apparatus having a cabinet that is made of metal at least partially, comprising a discharge path that connects a metal portion of the cabinet to a ground portion provided in the electronic apparatus, the discharge path including a series circuit of a discharge tube and a parallel circuit of a first resistor and a high-voltage capacitor, and a second resistor that is connected in parallel to the series circuit.

The invention also provides a second electronic apparatus having a cabinet that is made of metal at least partially, comprising a discharge path that connects a metal portion of the cabinet to a ground portion provided in the electronic apparatus, the discharge path including a parallel circuit of a resistor and a discharge tube.

Further, the invention provides a third electronic apparatus having a cabinet that is made of metal at least partially, comprising a discharge path that connects a metal portion of the cabinet to a ground portion provided in the electronic apparatus, the discharge path including a parallel circuit of a resistor and a capacitor.

In the first electronic apparatus according to the invention, the series circuit in which the discharge tube is connected in series to the parallel circuit of the first resistor and the high-voltage capacitor and the second resistor that is connected in parallel to the series circuit are inserted in the discharge path that connects the metal portion of the cabinet to the ground portion provided in the electronic apparatus.

The second resistor serves to cause a discharge current occurring constantly from the metal portion of the cabinet to flow to the ground and to prevent a steep current due to electrostatic discharge. The discharge tube serves to effectively absorb a high voltage occurring in the metal portion of the cabinet and to cause it to escape to the ground side.

For example, when a temporary high voltage has occurred at the ground portion side owing to an indirect lightning stroke, the parallel circuit of the first resistor and the high-voltage capacitor converts high-voltage, long-wavelength pulses caused by the indirect lightning stroke into as short pulses as possible by means of the capacitor and thereby prevents large power from being transmitted directly to the metal portion of the cabinet. By transmitting the pulses that have been reduced by the parallel circuit to the metal portion of the cabinet via the discharge tube that is connected in series to the parallel circuit, abrupt voltage increase at the cabinet side is prevented and hence influence on a user is minimized.

Therefore, by providing the above parallel circuit in the discharge path of the cabinet, in the electronic apparatus having the metal cabinet, it becomes possible to effectively ground the metal portion of the cabinet and to cope with an indirect lightning stroke or the like while reducing impact of static electricity and preventing generation of a high voltage.

In the second electronic apparatus according to the invention, the parallel circuit consisting of the resistor and the discharge tube is inserted in the discharge path that connects the metal portion of the cabinet to the ground portion provided in the electronic apparatus.

In the parallel circuit, the resistor serves to cause a discharge current occurring constantly from the metal portion of the cabinet to flow to the ground and to prevent a steep current due to electrostatic discharge. The discharge tube serves to effectively absorb a high voltage occurring in the metal portion of the cabinet and to cause it to escape to the ground side.

Therefore, by providing the above parallel circuit in the discharge path of the cabinet, in the electronic apparatus having the metal cabinet, it becomes possible to effectively ground the metal portion of the cabinet while reducing impact of static electricity and preventing generation of a high voltage.

In the third electronic apparatus according to the invention, the parallel circuit consisting of the resistor and the capacitor is inserted in the discharge path that connects the metal portion of the cabinet to the ground portion provided in the electronic apparatus.

In the parallel circuit, the resistor serves to cause a discharge current occurring constantly from the metal portion of the cabinet to flow to the ground and to prevent a steep current due to electrostatic discharge. The capacitor serves to effectively reduce a steep high voltage occurring in the metal portion of the cabinet.

Therefore, by providing the above parallel circuit in the discharge path of the cabinet, in the electronic apparatus having the metal cabinet, it becomes possible to effectively ground the metal portion of the cabinet while reducing impact of static electricity and preventing generation of a high voltage.

DETAILED DESCRIPTION OF THE PREFERRED EMBODIMENTS

Electronic apparatuses according to embodiments of the present invention will be hereinafter described.

Figure 1:
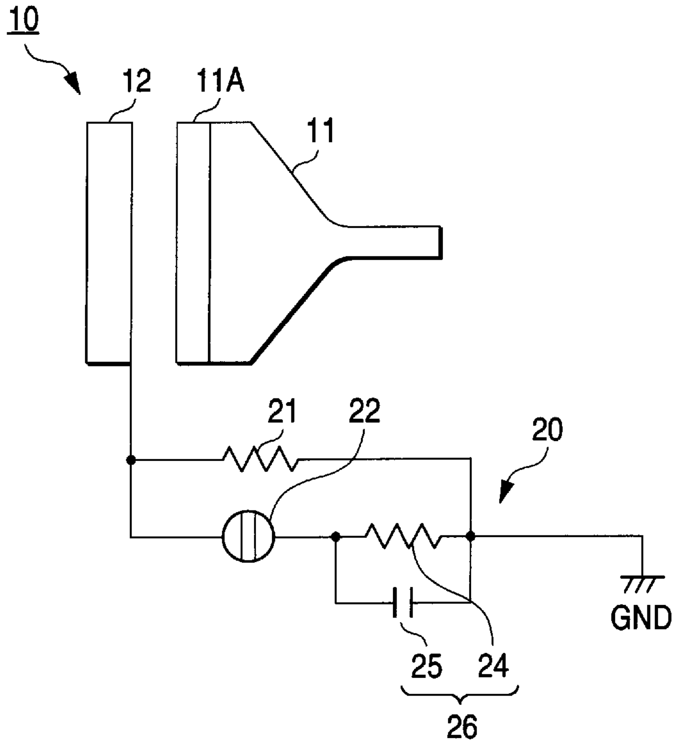
FIG. 1 is a schematic diagram showing the configuration of an electronic apparatus according to a first embodiment of the present invention.

FIG. 1 is a schematic diagram showing the configuration of an electronic apparatus according to a first embodiment of the invention.

The electronic apparatus according to this embodiment is a TV receiver 10 using a CRT 11. The TV receiver 10 has a front cabinet 12 that surrounds the outer circumferential portion of a face panel 11A of the CRT 11. The front cabinet 12 is made of metal.

That is, by using the metal front cabinet 12, the TV receiver 10 of this embodiment is advantageous in design over TV receivers using a front cabinet made of a synthetic resin and realizes a product specification with an image of a higher grade than in the case of using a synthetic resin.

The TV receiver 10 is provided with a chassis board (not shown) that is mounted with various circuit parts, a back cabinet (not shown), etc. The chassis board is provided with a ground portion GND, which serves to ground the entire TV receiver 10 by using a power line.

A discharge path 20 is provided between the front cabinet 12 and the ground portion GND, whereby the front cabinet 12 is grounded.

The discharge path 20 has a series circuit in which a discharge tube 22 is connected in series to a parallel circuit 26 of a first resistor 24 and a high-voltage capacitor 25 and a second resistor 21 that is connected in parallel to the above series circuit.

Inserted between the front cabinet 12 and the ground portion GND, the second resistor 21 serves to absorb a current of CRT discharge that occurs constantly.

Connected in parallel to the second resistor 21, the series circuit consisting of the discharge tube 22 and the parallel circuit 26 of the first resistor 24 and the high-voltage capacitor 25 discharges at a voltage of 7 kV, for example.

The discharge path 20 having the above structure effectively discharges a voltage that occurs at the front cabinet 12 side and thereby keeps the front cabinet 12 side at a low potential. Further, the discharge path 20 prevents a sudden flow of current by means of the second resistor 21 and thereby reduces the influence of static electricity to a user.

The parallel circuit 26 consisting of the first resistor 24 and the high-voltage capacitor 25 is connected in series to the ground portion GND side of the discharge tube 22.

The parallel circuit 26 having the above structure has a function of causing a discharge current (mentioned above) from the discharge tube 22 to escape to the front cabinet 12 side as well as a function of converting high-voltage pulses occurring at the ground portion GND side into pulses having as low a voltage level as possible and causes those pulses to escape to the front cabinet 12 via the discharge tube 22.

For example, there occurs a case that the TV receiver 10 of this embodiment is influenced by an indirect lightning stroke, in which case the ground portion GND side is temporarily given a high voltage. More specifically, the TV receiver 10 of this kind is configured in such a manner that when the influence of an indirect lightning stroke is large, an anti-lightning circuit in the apparatus is activated and causes large power to escape to the primary side of the power source. When the influence of an indirect lightning stroke is small, the anti-lightning circuit is not activated and a certain high voltage is generated at the ground portion GND.

Therefore, there is fear that if the high voltage at the ground portion GND is transmitted as it is to the front cabinet 12 side, a user who touches the front cabinet 12 may feel unpleasant.

In view of the above, in this embodiment, high voltage pulses having a relatively long wavelength of a high voltage generated at the ground portion GND side are converted into pulses having as low a voltage level as possible by dispersing those into relatively short pulses by means of the parallel circuit 26 consisting of the first resistor 24 and the high-voltage capacitor 25. Resulting pulses are caused to escape to the front cabinet 12 via the discharge tube 22.

Charge that has escaped to the front cabinet 12 is released from the front cabinet 12 by natural discharge or released to the ground portion GND side after the voltage of the ground portion GND has decreased.

As described above, being provided, in the discharge path 20 of the front cabinet 12, with the series circuit in which the discharge tube 22 is connected in series to the parallel circuit of the first resistor 24 and the high-voltage capacitor 25 and the second resistor 21 that is connected in parallel to the above series circuit, the TV receiver 10 of this embodiment can effectively ground the metal portion of the cabinet 12 and cope with an indirect lightning stroke or the like while reducing impact of static electricity and preventing generation of a high voltage.

Figure 2:
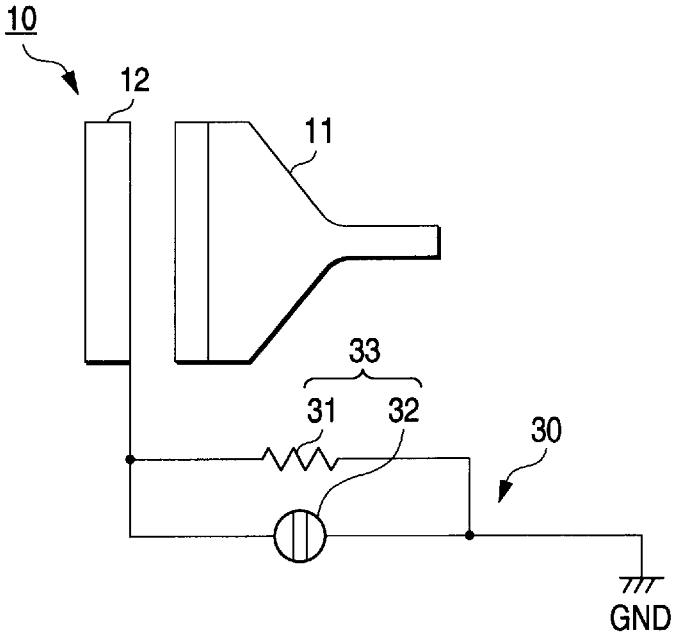
FIG. 2 is a schematic diagram showing the configuration of an electronic apparatus according to a second embodiment of the invention.

FIG. 2 is a schematic diagram showing the configuration of an electronic apparatus according to a second embodiment of the invention. The components in FIG. 2 having the same components in FIG. 1 are given the same reference numerals as the latter and will not be described.

As in the case of the first embodiment, this embodiment is directed to a TV receiver 10 using a CRT 11 that has a metal front cabinet 12.

In this TV receiver 10, a discharge path 30 between the front cabinet 12 and the ground portion GND has a parallel circuit 33 consisting of a resistor 31 and a discharge tube 32.

Inserted between the front cabinet 12 and the ground portion GND, the resistor 31 serves to absorb a current of CRT discharge that occurs constantly.

Connected in parallel to the resistor 31, the discharge tube 32 discharges at a voltage of 7 kV, for example.

The parallel circuit 33 having the above structure effectively discharges a voltage that occurs at the front cabinet 12 side and thereby keeps the front cabinet 12 side at a low potential. Further, the parallel circuit 33 prevents a sudden flow of current by means of the resistor 31 and thereby reduces the influence of static electricity to a user.

As described above, being provided with the parallel circuit 33 in the discharge path 30 of the front cabinet 12, the TV receiver 10 of this embodiment can effectively ground the metal portion of the cabinet 12 while reducing impact of static electricity and preventing generation of a high voltage.

Figure 3:
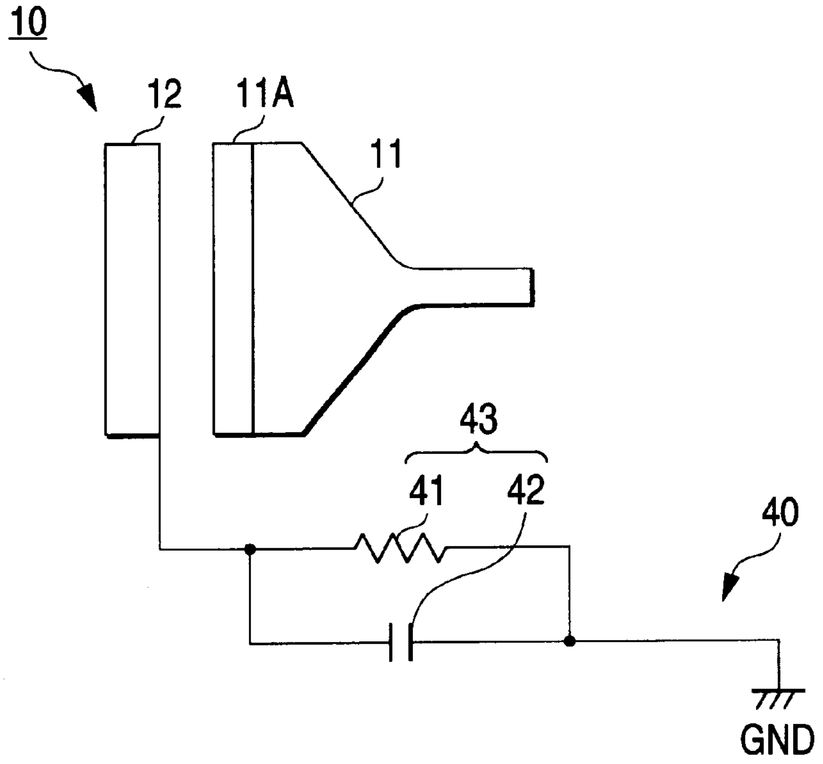
FIG. 3 is a schematic diagram showing the configuration of an electronic apparatus according to a third embodiment of the invention.

FIG. 3 is a schematic diagram showing the configuration of an electronic apparatus according to a third embodiment of the invention. The components in FIG. 3 having the same components in FIG. 1 are given the same reference numerals as the latter and will not be described.

As in the case of the first embodiment, this embodiment is directed to a TV receiver 10 using a CRT 11 that has a metal front cabinet 12.

In this TV receiver 10, a discharge path 40 between the front cabinet 12 and the ground portion GND has a parallel circuit 43 consisting of a resistor 41 and a capacitor 42.

Inserted between the front cabinet 12 and the ground portion GND, the resistor 41 absorbs a current of CRT discharge that occurs constantly. The capacitor 42 is connected in parallel to the resistor 41.

The parallel circuit 43 having the above structure effectively discharge a voltage occurring at the front cabinet 12 side and thereby keeps the front cabinet 12 side at a low potential. Further, the parallel circuit 43 prevents a sudden flow of current by means of the resistor 41 and thereby reduces the influence of static electricity to a user.

As described above, being provided with the parallel circuit 43 in the discharge path 40 of the front cabinet 12, the TV receiver 10 of this embodiment can effectively ground the metal portion of the cabinet 12 while reducing impact of static electricity and preventing generation of a high voltage.

Although in each of the above embodiments the electronic apparatus to which the invention is applied is a TV receiver using a CRT, the invention is not limited to such a case. The invention can similarly be applied to other electronic apparatuses having a metal cabinet.

The cabinet for which a discharge path is provided is not limited to a cabinet that is made of metal entirely and may be a cabinet only part of which is made of metal.

As described above, in one electronic apparatus according to the invention, the series circuit in which the discharge tube is connected in series to the parallel circuit of the first resistor and the high-voltage capacitor and the second resistor that is connected in parallel to the above series circuit are inserted in the discharge path that connects the metal portion of the cabinet to the ground portion provided in the electronic apparatus.

Therefore, in the electronic apparatus having the metal cabinet, the above discharge path makes it possible to effectively ground the metal portion of the cabinet and to cope with an indirect lightning stroke or the like while reducing impact of static electricity and preventing generation of a high voltage.

In another electronic apparatus according to the invention, the parallel circuit consisting of the resistor and the discharge tube is inserted in the discharge path that connects the metal portion of the cabinet to the ground portion provided in the electronic apparatus.

Therefore, in the electronic apparatus having the metal cabinet, the discharge path provided with the above parallel circuit makes it possible to effectively ground the metal portion of the cabinet while reducing impact of static electricity and preventing generation of a high voltage.

In a further electronic apparatus according to the invention, the parallel circuit consisting of the resistor and the capacitor is inserted in the discharge path that connects the metal portion of the cabinet to the ground portion provided in the electronic apparatus.

Therefore, in the electronic apparatus having the metal cabinet, the discharge path provided with the above parallel circuit makes it possible to effectively ground the metal portion of the cabinet while reducing impact of static electricity and preventing generation of a high voltage.

What is claimed is:

1. An electronic apparatus having a cabinet that is made of metal at least partially, comprising:

a discharge path that connects a metal portion of the cabinet to a ground portion provided in the electronic apparatus, the discharge path including:

a series circuit of a discharge tube and a parallel circuit of a first resistor and a high-voltage capacitor; and a second resistor that is connected in parallel to the series circuit;

whereby said discharge path connects said metal portion of the cabinet to said ground portion directly.

2. The electronic apparatus according to claim 1, wherein the first resistor and the high-voltage capacitor of the series circuit are provided on the side of the ground portion.

3. The electronic apparatus according to claim 1, wherein the ground portion is provided on a chassis board of the electronic apparatus.

4. The electronic apparatus according to claim 1, wherein the electronic apparatus is a TV receiver using a CRT, and wherein the metal portion of the cabinet constitutes a front cabinet that surrounds an outer circumferential portion of a face panel of the CRT.

5. An electronic apparatus having a cabinet that is made of metal at least partially, comprising:

a discharge path that connects a metal portion of the cabinet to a ground portion provided in the electronic apparatus, the discharge path including a parallel circuit of a resistor and a discharge tube;

whereby said discharge path connects said metal portion of the cabinet to said ground portion directly.

6. The electronic apparatus according to claim 5, wherein the ground portion is provided on a chassis board of the electronic apparatus.

7. The electronic apparatus according to claim 5, wherein the electronic apparatus is a TV receiver using a CRT, and wherein the metal portion of the cabinet constitutes a front cabinet that surrounds an outer circumferential portion of a face panel of the CRT.

8. An electronic apparatus having a cabinet that is made of metal at least partially, comprising:

a discharge path that connects a metal portion of the cabinet to a ground portion provided in the electronic apparatus, the discharge path including a parallel circuit of a resistor and a capacitor;

whereby said discharge path connects said metal portion of the cabinet to said ground portion directly.

9. The electronic apparatus according to claim 8, wherein the ground portion is provided on a chassis board of the electronic apparatus.

10. The electronic apparatus according to claim 8, wherein the electronic apparatus is a TV receiver using a CRT, and wherein the metal portion of the cabinet constitutes a front cabinet that surrounds an outer circumferential portion of a face panel of the CRT.

* * * * *